United States Patent
Zhang

(10) Patent No.: US 11,100,956 B2
(45) Date of Patent: Aug. 24, 2021

(54) MP4 FILE PROCESSING METHOD AND RELATED DEVICE

(71) Applicant: Huawei Technologies Co., Ltd., Shenzhen (CN)

(72) Inventor: Mengwei Zhang, Suzhou (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 0 days.

(21) Appl. No.: 16/905,012

(22) Filed: Jun. 18, 2020

(65) Prior Publication Data

US 2020/0321031 A1    Oct. 8, 2020

Related U.S. Application Data

(63) Continuation of application No. PCT/CN2018/117838, filed on Nov. 28, 2018.

(30) Foreign Application Priority Data

Dec. 19, 2017    (CN) .......................... 201711379276.5

(51) Int. Cl.
*G11B 27/10*    (2006.01)
*H04N 5/91*    (2006.01)

(52) U.S. Cl.
CPC ............. *G11B 27/10* (2013.01); *H04N 5/91* (2013.01)

(58) Field of Classification Search
None
See application file for complete search history.

(56) References Cited

U.S. PATENT DOCUMENTS

| | | | |
|---|---|---|---|
| 2003/0061369 A1 | 3/2003 | Aksu et al. | |
| 2005/0053288 A1* | 3/2005 | Srinivasan | H04N 19/152 382/233 |
| 2010/0169390 A1 | 7/2010 | Park et al. | |
| 2010/0189440 A1* | 7/2010 | Julien | H04Q 11/0067 398/79 |
| 2015/0373380 A1 | 12/2015 | Tsukagoshi | |
| 2016/0007048 A1 | 1/2016 | Zhou et al. | |
| 2016/0163355 A1 | 6/2016 | Hirabayashi et al. | |
| 2016/0286192 A1* | 9/2016 | Yoneda | G11B 20/10 |

FOREIGN PATENT DOCUMENTS

| | | |
|---|---|---|
| CN | 1559119 A | 12/2004 |
| CN | 101083756 A | 12/2007 |
| CN | 101477575 A | 7/2009 |
| CN | 102723090 A | 10/2012 |
| CN | 103327362 A | 9/2013 |
| CN | 103404146 A | 11/2013 |
| CN | 104063447 A | 9/2014 |

(Continued)

*Primary Examiner* — Eileen M Adams
(74) *Attorney, Agent, or Firm* — Conley Rose, P.C.

(57) ABSTRACT

A Moving Picture Experts Group-4 (MP4) file processing method in the embodiments of this application includes storing private media information into a header of media data (MDAT) of an MP4 file during recording of the MP4 file, where the private media information includes a media information parameter of frame data in the MP4 file, and storing index information of the frame data into the MDAT at intervals, where the index information includes time domain information and space domain information of the frame data.

20 Claims, 7 Drawing Sheets

```
┌─────────────────────────────────────────┐
│                  MP4                    │
│  ┌───────────────────────────────────┐  │
│  │         File type FTYP            │  │
│  └───────────────────────────────────┘  │
│                                         │
│  ┌───────────────────────────────────┐  │
│  │                                   │  │
│  │         Media data MDAT           │  │
│  │                                   │  │
│  └───────────────────────────────────┘  │
│                                         │
│  ┌───────────────────────────────────┐  │
│  │                                   │  │
│  │     Media data container MOOV     │  │
│  │                                   │  │
│  └───────────────────────────────────┘  │
└─────────────────────────────────────────┘
```

(56) References Cited

FOREIGN PATENT DOCUMENTS

| | | | |
|---|---|---|---|
| CN | 104221390 | A | 12/2014 |
| CN | 105009595 | A | 10/2015 |
| CN | 105409235 | A | 3/2016 |
| CN | 105451073 | A | 3/2016 |
| CN | 105721809 | A | 6/2016 |
| CN | 105847724 | A | 8/2016 |
| CN | 105872484 | A | 8/2016 |
| CN | 106027930 | A | 10/2016 |
| CN | 106227623 | A | 12/2016 |
| WO | 2013163448 | A1 | 10/2013 |

* cited by examiner

| | | | | | | | | |
|---|---|---|---|---|---|---|---|---|
| MDAT | MDAT size | MDAT type | The MDAT size is 64 bits | | | | | |
| Private data Box: HISI | HISI size | HISI type | Version | Historical data | Backup unit | Co64 flag | Fixed-frequency flag | |
| Video Video | Audio/Video stream container information size | Audio/Video stream container type | Audio/Video stream container identification number | Time scale | codec type | Width | Height | Bit rate | ... | Manufacturer information Handlr name |
| Audio Audio | Audio/Video stream container information size | Audio/Video stream container type | Audio/Video stream container identification number | Time scale | Codec type | Channel quantity | Sampling rate | Samples per frame | ... | Manufacturer information Handlr name |
| Data stream Meta | Audio/Video stream container information size | Audio/Video stream container type | Audio/Video stream container identification number | Time scale | Codec type | Channel quantity | Height | Speed | Manufacturer information Handlr name |

FIG. 5

| | |
|---|---|
| Size + type | |
| Audio/Video stream container identification number | Sample table stbl |
| Audio/Video stream container identification number | Sample table stbl |
| Audio/Video stream container identification number | Sample table stbl |

FIG. 6

| | |
|---|---|
| Private frame information | Frame data buffer |
| Private frame information | Frame data buffer |
| ... | |
| Private frame information | Frame data buffer |

FIG. 7

| Audio/Video stream container identification number | Key frame flag keyFrameFlag | Timestamp | Frame data length | Frame data frameData... |
|---|---|---|---|---|
| Audio/Video stream container identification number | Key frame flag keyFrameFlag | Timestamp | Frame data length | Frame data frameData... |
| Audio/Video stream container identification number | Key frame flag keyFrameFlag | Timestamp | Frame data length | Frame data frameData... |
| ... | | | | |

FIG. 8

| Media data header MDAT header + private media information private media info | | | | |
|---|---|---|---|---|
| Audio/Video stream container identification number | Key frame flag | Timestamp | Frame data length | Frame data frameData... |
| Audio/Video stream container identification number | Key frame flag | Timestamp | Frame data length | Frame data frameData... |
| Audio/Video stream container identification number | Key frame flag | Timestamp | Frame data length | Frame data frameData... |
| ⋮ | | | | |
| Index table index table | | | | |
| ⋮ | | | | |
| Index table index table | | | | |
| ⋮ | | | | |
| ⋮ | | | | |
| Index table index table | | | Frame data length | Frame data frameData... |
| ⋮ | | | | |
| Audio/Video stream container identification number | Key frame flag | Timestamp | | |

FIG. 9

MP4 FILE PROCESSING METHOD AND RELATED DEVICE

CROSS-REFERENCE TO RELATED APPLICATIONS

This application is a continuation of International Patent Application No. PCT/CN2018/117838, filed on Nov. 28, 2018, which claims priority to Chinese Patent Application No. 201711379276.5, filed on Dec. 19, 2017. The disclosures of the aforementioned applications are hereby incorporated by reference in their entireties.

TECHNICAL FIELD

This application relates to the communications field, and in particular, to a Moving Picture Experts Group-4 (MP4) file processing method and a related device.

BACKGROUND

With development of mobile communications and multimedia technologies, consumers use more surveillance devices such as surveillance Internet Protocol (IP) cameras and consumer cameras in life, and encapsulation of standard MP4 files in video recording services of camera products is a mainstream choice for manufacturers.

Due to restrictions of an MP4 protocol, in a scenario such as random power-off or card removal, a file cannot be played if a file trailer is incomplete. How to ensure that a file that has been recorded before abnormal termination is available is a strong requirement for current consumer surveillance products.

FIG. 1 shows a rough structure of an MP4 file format. All data in the MP4 file is assembled using a box. Each box uses a format shown in FIG. 2. There are three boxes file type (FTYP), media data (MDAT), and media data container (MOOV). FTYP is identification information at the beginning of an MP4 file, MDAT stores actual bitstream information, and MOOV stores time domain information and space domain information of each piece of frame data in a bitstream. When an exception such as power-off or card removal occurs, MOOV information is not written in time. As a result, time domain information and space domain information of the entire MP4 file is incomplete, and consequently the file cannot be played normally.

To resolve the foregoing problem, in other approaches, frame data of a video frame is extracted from a damaged video filestream based on a video frame structure feature in a codec feature library, to generate a video frame sequence. Then time-domain information and space-domain information of data in a container file are reconstructed based on a decoding parameter, a codec type, a frame sequence, location information, and index information that are recorded, to generate a file of a corresponding format. However, the other approach has the following disadvantages. A stream needs to be parsed, wasting central processing unit (CPU) resources. For some parameters that are not included in a stream, only default values can be provided, for example, a playback rate. It takes an excessively long time to recover a large file with a high frame rate, causing poor user experience.

To resolve the foregoing problem, in another approach, index information of MOOV of an MP4 file is periodically stored into backup files in a storage medium. After the device is restarted, a damaged file is found, a corresponding backup file is selected, and index information is added to the MP4 file. The other approach has the following disadvantages. When the storage medium is an secure digital (SD) card, the backup files that store index information increase disk read/write I/O performance consumption of a disk, a frame loss is caused in a scenario of a high frame rate, a large bit rate, and/or long duration, storage space is discontinuous due to an increase of a quantity of files in a file system, and a frame loss is caused due to a cluster chain hole in a subsequently recorded file. When the storage medium is a flash, frequent update of backup data shortens a service life of the storage medium. Since recovery precision depends on an update frequency of a backup file, a last frame that is before an exception cannot be recovered, and CPU usage is excessively high when backup data is updated excessively frequently.

SUMMARY

Embodiments of this application provide an MP4 file processing method and a related device, to resolve a problem that a file cannot be played because a file trailer is incomplete, and ensure that an MP4 file that has been recorded before abnormal termination is available.

A first aspect of the embodiments of this application provides an MP4 file processing method. The method further includes storing private media information into a header of MDAT of an MP4 file during recording of the MP4 file, where the private media information includes a media information parameter of frame data in the MP4 file, and storing index information of the frame data into the MDAT at intervals, where the index information includes time domain information and space domain information of the frame data. When a file trailer of the MP4 file is incomplete, in this embodiment, MOOV may be recovered using the private media information and the index information in the MDAT. In this way, the file can be recovered without introducing a concept of a backup file, occupying additional I/O performance of a file system, and affecting a service life of a flash, or causing fragmentation of a file system.

In a possible design, in a first implementation of the first aspect of the embodiments of this application, the index information includes an index table and/or private frame information.

In a possible design, in a second implementation of the first aspect of the embodiments of this application, the storing index information of the frame data into the MDAT at intervals includes storing one index table into the MDAT at an interval of N-byte frame data, where the index table includes time domain information and space domain information of N-byte frame data before the index table. This embodiment further describes how to store the index information of the frame data into the MDAT at intervals, thereby enriching implementations of this embodiment.

In a possible design, in a third implementation of the first aspect of the embodiments of this application, the storing index information of the frame data into the MDAT at intervals includes, when each piece of frame data is written into the MDAT, storing private frame information before each piece of frame data, where the private frame information includes time domain information and space domain information of one piece of frame data that is after the private frame information. This embodiment further describes how to store the index information of the frame data into the MDAT at intervals, thereby enriching implementations of this embodiment.

In a possible design, in a fourth implementation of the first aspect of the embodiments of this application, after the storing index information of the frame data into the MDAT at intervals, the method further includes recovering the MP4 file based on the private media information and the index information. In this embodiment, a recovery step in this application is added, thereby improving completeness of this embodiment.

In a possible design, in a fifth implementation of the first aspect of the embodiments of this application, the recovering the MP4 file based on the private media information and the index information includes reading the private media information to obtain a media information parameter of each piece of frame data, merging the index tables to obtain a complete index table, and recovering the MP4 file based on the media information parameter of each piece of frame data and the complete index table. This embodiment further describes how to recover the MP4 file based on the private media information and the index information, thereby improving operability of this embodiment.

In a possible design, in a sixth implementation of the first aspect of the embodiments of this application, after the merging the index tables to obtain a complete index table, the method further includes parsing private frame information of trailer frame data to obtain time domain information and space domain information of the trailer frame data, where the trailer frame data is frame data that is after a last index table. In this embodiment, a step performed after the index tables are merged is added, thereby improving completeness of this embodiment.

In a possible design, in a seventh implementation of the first aspect of the embodiments of this application, the recovering the MP4 file based on the media information parameter of each piece of frame data and the complete index table includes recovering the MP4 file based on the media information parameter of each piece of frame data, the complete index table, and the time domain information and the space domain information of the trailer frame data. This embodiment of this application further describes in detail how to recover the MP4 file, thereby enriching an implementation means of recovering the MP4 file.

In a possible design, in an eighth implementation of the first aspect of the embodiments of this application, the recovering the MP4 file based on the private media information and the index information includes reading the private media information to obtain a media information parameter of each piece of frame data, parsing private frame information that is before each piece of frame data, to obtain time domain information and space domain information of each piece of frame data, and recovering the MP4 file based on the media information parameter of each piece of frame data and the time domain information and the space domain information of each piece of frame data. This embodiment of this application more further describes in detail how to recover the MP4 file, thereby enriching an implementation means of recovering the MP4 file.

A second aspect of the embodiments of this application provides an MP4 file processing device, including a first storage unit configured to store private media information into a header of MDAT of an MP4 file during recording of the MP4 file, where the private media information includes a media information parameter of frame data in the MP4 file, and a second storage unit configured to store index information of the frame data into the MDAT at intervals, where the index information includes time domain information and space domain information of the frame data.

When a file trailer of the MP4 file is incomplete, in this embodiment, MOOV may be recovered using the private media information and the index information in the MDAT. In this way, the file can be recovered without introducing a concept of a backup file, occupying additional input/output (I/O) performance of a file system, affecting a service life of a flash, or causing fragmentation of a file system.

In a possible design, in a first implementation of the second aspect of the embodiments of this application, the index information includes an index table and/or private frame information.

In a possible design, in a second implementation of the second aspect of the embodiments of this application, the second storage unit includes a first storage subunit configured to store one index table into the MDAT at an interval of N-byte frame data, where the index table includes time domain information and space domain information of N-byte frame data before the index table.

This embodiment further describes how to store the index information of the frame data into the MDAT at intervals, thereby enriching implementations of this embodiment.

In a possible design, in a third implementation of the second aspect of the embodiments of this application, the second storage subunit is configured to, when each piece of frame data is written into the MDAT, store private frame information before each piece of frame data, where the private frame information includes time domain information and space domain information of one piece of frame data that is after the private frame information.

This embodiment further describes how to store the index information of the frame data into the MDAT at intervals, thereby enriching implementations of this embodiment.

In a possible design, in a fourth implementation of the second aspect of the embodiments of this application, the device further includes a recovery unit configured to recover the MP4 file based on the private media information and the index information.

In this embodiment, a recovery step in this application is added, thereby improving completeness of this embodiment.

In a possible design, in a fifth implementation of the second aspect of the embodiments of this application, the recovery unit includes a first reading subunit configured to read the private media information to obtain a media information parameter of each piece of frame data, a merging subunit configured to merge the index tables to obtain a complete index table, and a first recovery subunit configured to recover the MP4 file based on the media information parameter of each piece of frame data and the complete index table.

This embodiment further describes how to recover the MP4 file based on the private media information and the index information, thereby improving operability of this embodiment.

In a possible design, in a sixth implementation of the second aspect of the embodiments of this application, the recovery unit further includes a first parsing subunit configured to parse private frame information of trailer frame data to obtain time domain information and space domain information of the trailer frame data, where the trailer frame data is frame data that is after a last index table.

In this embodiment, a step performed after the index tables are merged is added, thereby improving completeness of this embodiment.

In a possible design, in a seventh implementation of the second aspect of the embodiments of this application, the first recovery subunit includes a recovery module configured to recover the MP4 file based on the media information parameter of each piece of frame data, the complete index table, and the time domain information and the space domain information of the trailer frame data.

This embodiment of this application further describes in detail how to recover the MP4 file, thereby enriching an implementation means of recovering the MP4 file.

In a possible design, in an eighth implementation of the second aspect of the embodiments of this application, the recovery unit includes a second reading subunit configured to read the private media information to obtain a media information parameter of each piece of frame data, a second parsing subunit configured to parse private frame information that is before each piece of frame data, to obtain time domain information and space domain information of each piece of frame data, and a second recovery subunit configured to recover the MP4 file based on the media information parameter of each piece of frame data and the time domain information and the space domain information of each piece of frame data.

This embodiment of this application more further describes in detail how to recover the MP4 file, thereby enriching an implementation means of recovering the MP4 file.

Another aspect of this application provides a computer-readable storage medium. The computer-readable storage medium stores an instruction. When the instruction is run on a computer, the computer is enabled to perform the methods described in any one of the first aspect or the implementations of the first aspect.

Another aspect of this application provides a computer program product including an instruction. When the computer program product is run on a computer, the computer is enabled to perform the methods described in the foregoing aspect.

It can be learned from the foregoing technical solutions that the embodiments of this application have the following advantages.

In the embodiments of this application, the private media information is stored into the header of the MDAT of the MP4 file during recording of the MP4 file. The private media information includes the media information parameter of the frame data in the MP4 file. The index information of the frame data is stored into the MDAT at intervals. The index information includes the time domain information and the space domain information of the frame data. When the file trailer of the MP4 file is incomplete, the MOOV may be recovered using the private media information and the index information in the MDAT. In this way, the file may be recovered without introducing a concept of a backup file, occupying additional I/O performance of the file system, affecting a service life of a flash, or causing fragmentation of a file system.

BRIEF DESCRIPTION OF DRAWINGS

FIG. 5 is a schematic structural diagram of private media info according to an embodiment of this application.

FIG. 6 is a schematic diagram of an index table according to an embodiment of this application.

FIG. 7 is a schematic structural diagram of storing private frame info before frame data according to an embodiment of this application.

FIG. 8 is a schematic diagram of private frame data according to an embodiment of this application.

FIG. 9 is a schematic structural diagram of an MP4 master file that is after abnormal card removal according to an embodiment of this application.

DESCRIPTION OF EMBODIMENTS

The embodiments of this application provide an MP4 file processing method and a related device, to resolve a problem that a file cannot be played because a file trailer is incomplete, and ensure that an MP4 file that has been recorded before abnormal termination is available.

In the specification, claims, and accompanying drawings of this application, terms "first", "second", "third", and "fourth", and so on (if any) are intended to distinguish between similar objects, but do not necessarily indicate a specific order or sequence. It should be understood that the data termed in such a way are interchangeable in appropriate circumstances so that the embodiments described herein can be implemented in orders other than the order illustrated or described herein. Moreover, terms "include", "comprise", and any other variants thereof are intended to cover the non-exclusive inclusion, for example, a process, method, system, product, or device that includes a list of steps or units is not necessarily limited to those units, but may include other units not expressly listed or inherent to such a process, method, product, or device.

Figure 1:
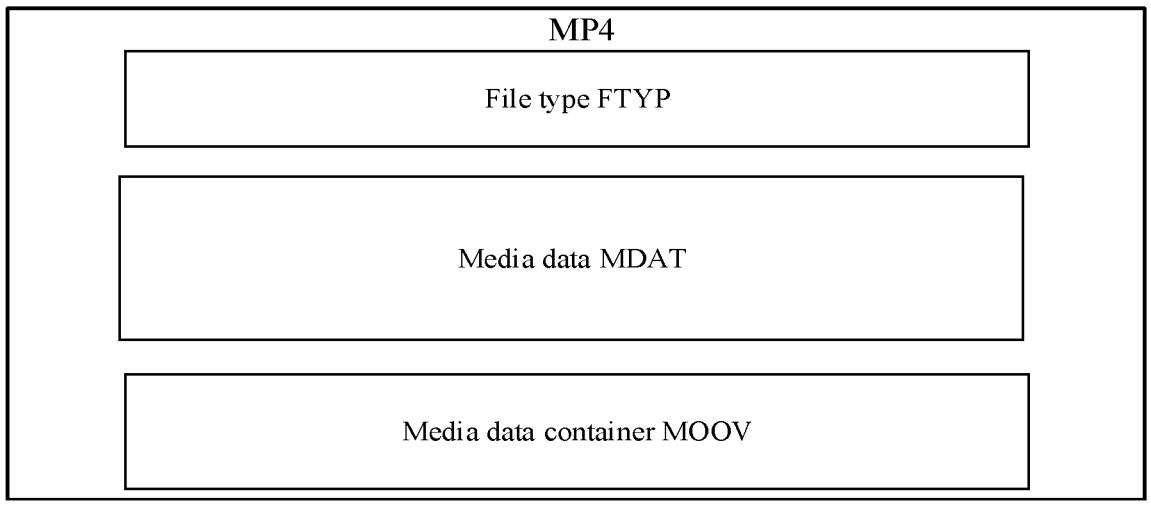
FIG. 1 is a schematic structural diagram of an MP4 file format according to an embodiment of this application.
Figure 2:
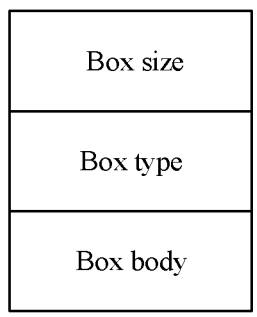
FIG. 2 is a schematic structural diagram of a box according to an embodiment of this application.
Figure 3:
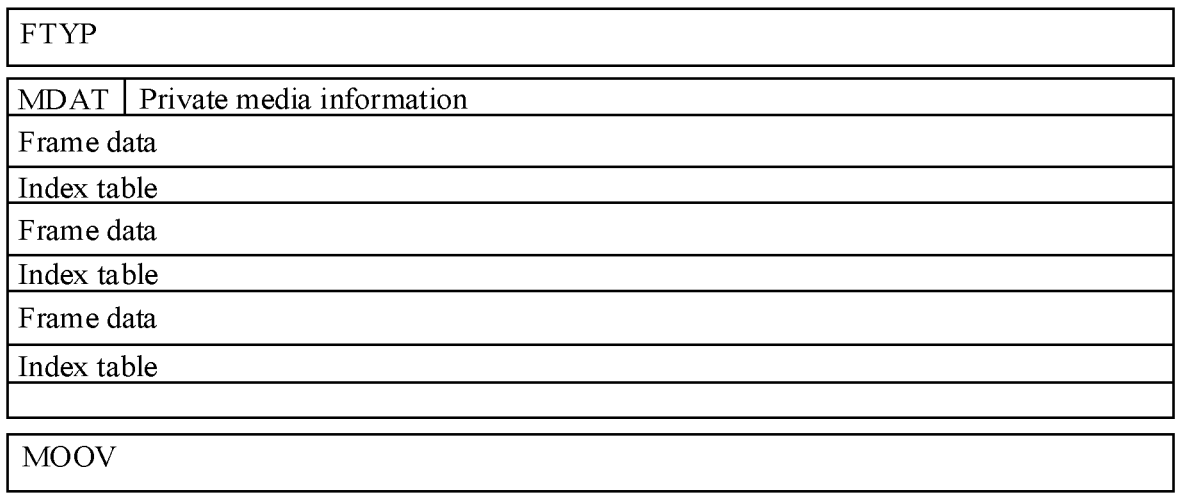
FIG. 3 is a schematic diagram of an encapsulation structure in an MP4 file processing method according to an embodiment of this application.

The MP4 file processing method in the embodiments of this application is divided into two parts a recording process and a recovery process. The recording process is a process of generating an MP4 master file. The recovery process is a process of recovering an MP4 file based on the MP4 master file generated in the recording process. As shown in FIG. 3, in the recording process, information required for recovery, such as private media information and index tables inserted at intervals, is written on a premise that the master file meets a requirement of a standard MP4 encapsulation format. The private media information (private media info) is a media information parameter or the like of each audio/video stream, and the index table is a frame data index table for each piece of frame data. In addition, storage of each piece of frame data is upgraded to streaming storage. In an embodiment, time domain index information and space domain index information of each piece of frame data can be obtained based on the private frame information that is before the frame data.

Figure 4:
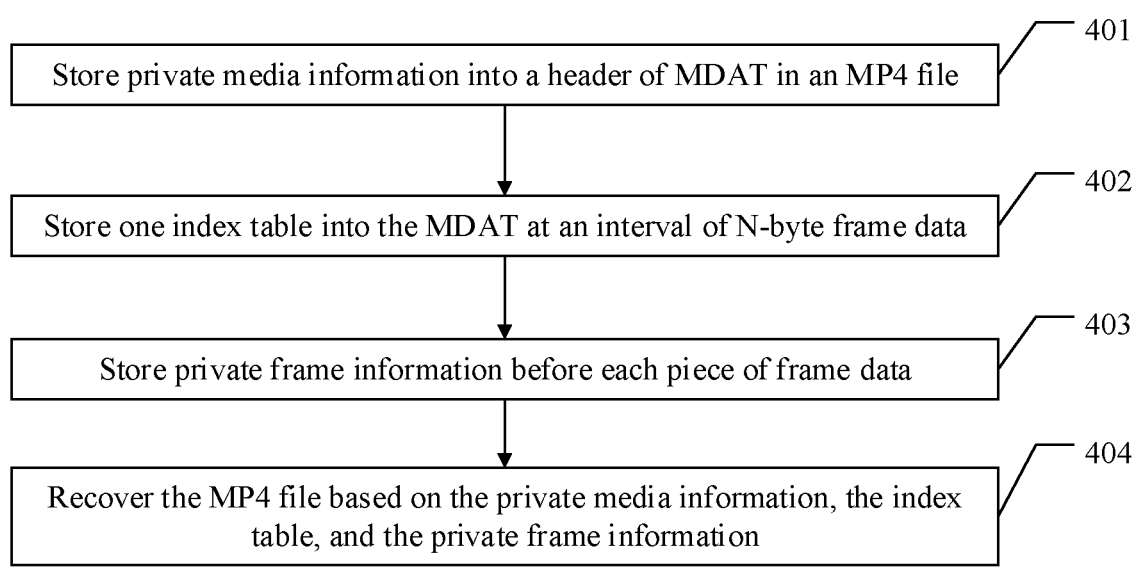
FIG. 4 is a schematic diagram of an MP4 file processing method according to an embodiment of this application.

Referring to FIG. 4, an embodiment of an MP4 file processing method in the embodiments of this application includes the following steps.

401. Store private media information into a header of MDAT of an MP4 file.

In this embodiment, during recording of the MP4 file, the private media information private media info is stored into the header of the MDAT in a master file of the MP4 file. The private media information includes a media information parameter or the like of each audio stream or each video stream. FIG. 5 shows a structure of the private media information. A corresponding audio stream, video stream, or data stream or the like may be selectively added to or deleted from the structure of the private media information based on an embodiment. For example, some MP4 files do not need audio information, in this case, data about an audio stream may be deleted.

402. Store one index table into the MDAT at an interval of N-byte frame data.

In this embodiment, during recording of the MP4 file, one index table is stored into the MDAT at an interval of N-byte frame data. The index table includes time domain information and space domain information of N-byte frame data that is before the index table. The N bytes may be 50 Megabytes, or may be set to another value, for example, 100 M. A specific value of N is not limited herein.

FIG. 6 shows a structure of an index table. An index table sample table (stbl) in the index table is a standard stbl defined in an MP4 encapsulation protocol, and may be generated synchronously with a frame writing operation in a recording process. Each audio/video stream corresponds to one index table stbl, and each index table is written at an $(n \times N)^{th}$ byte (where n is a positive integer, and N represents an interval length between index tables, that is, one index table is stored after each piece of N-byte data). The index table is an index table for N-byte stream data. If there is an index table for each N-byte stream data, each frame of stream data may not need to be parsed for restoration. This can greatly reduce recovery duration. All index tables are merged after being obtained, in this case, an index table of a complete file may be generated.

It should be noted that the index table may be a segment index table, that is, a segment index table for $n^{th}$ N-byte data (where n is a positive integer, and N represents an interval length between index tables, that is, one index table is stored after each piece of N-byte byte data, where the index table includes time domain information and space domain information of N-byte byte data that is before the index table). In addition, the index table may alternatively be a complete index table, for first (n×N) bytes of data, generated through addition (that is, the index table is generated through superimposing stepwise, and the index table includes time domain information and space domain information of all the (n×N) bytes of data). For recovering the complete index table, it is unnecessary to parse and merge all index tables, but only a last index table needs to be found to restore a MOOV.

403. Store the private frame information before each piece of frame data.

In this embodiment, storage of each piece of frame data is extended to streaming storage. Each time a piece of frame data is written into the MDAT of the MP4 file, private frame information private frame info written before the stream data is stored. FIG. 7 is a schematic diagram in which private frame info is stored before frame data.

FIG. 8 shows a specific structure of private frame data. When the frame data is written, a track identification (ID) indicating a specific stream of the frame data, a flag key-FrameFlag indicating whether a frame is an I frame, a timestamp of the frame data, and a frame data length (framelen) are first written, and then index information for each piece of frame data may be restored subsequently based on information that is before each frame, in this way, a last frame of data in the MP4 file is recovered.

It should be noted that step 403 may be an optional step, that is, in this application, private frame info may alternatively not be written, and private frame info before each piece of frame data is used to recover a last frame in the MP4 file. For example, in an embodiment, if a user pursues reducing recovery duration instead of recovery precision, the last frame in the MP4 file may be recovered, and the private frame info may be omitted. That is, the file is recovered using only data such as private media info and the index table. In this case, a last index table in the file can be recovered, and stream data after the last index table is discarded, and does not need to be parsed. This greatly increases a recovery rate.

404. Recover the MP4 file based on the private media information, the index table, and the private frame information.

In this embodiment, FIG. 9 shows a structure of a main MP4 file that is after abnormal card removal. A file trailer in the structure is incomplete and is lack of MOOV. In this application, MOOV information in the MP4 file is recovered based on the private media information, the index table, and the private frame information.

A recovery process is as follows.

Read the private media information private media info in MDAT of the MP4 file, parse all parameters required for encapsulation, such as media information and a playback rate of each data stream, and restore information about each stream in the reorganized MOOV.

Parse the file at n×N (n=1, 2, 3 . . . ) bytes in sequence, merge segment index tables for each data block, and update, into the reorganized MOOV, an index table obtained through merging.

Parse each frame of a last data block for which there is no segment index table, recover the file to the last frame using the private frame info information to form a final MOOV, add the MOOV to an original file, and update a MDAT size in order to recover the file.

It should be noted that, if a user pursues reducing recovery duration instead of recovery precision, a last frame in the MP4 file may be recovered, and data such as the private frame info may be omitted. That is, the file is recovered using only data such as the private media info and the index table. In this case, a last index table in the file can be recovered, and subsequent stream data is discarded, with no need to parse each frame of last stream data. This greatly increases a recovery rate.

In this embodiment of this application, during recording of the MP4 file, the private media information is stored into the header of the MDAT of the MP4 file. The private media information includes a media information parameter of frame data in the MP4 file. Index information of the frame data is stored into the MDAT at intervals. The index information includes time domain information and space domain information of the frame data. When the file trailer of the MP4 file is incomplete, the MOOV may be recovered using the private media information and the index information in the MDAT. The file may be recovered without introducing a concept of a backup file, occupying additional I/O performance of a file system, affecting a service life of a flash, or causing fragmentation of a file system.

In addition, this application has at least the following beneficial effects.

A last frame of complete data in an incomplete file can be recovered in real time.

Attributes set by a user during encapsulation, such as a playback rate, can be recovered without backup data.

There is no need to parse each frame of the entire file to recover the file, thereby saving CPU resources.

When a large file with a high frame rate is recovered, recovery duration is significantly shorter than that in other solutions (where an entire stream is parsed).

Figure 10:
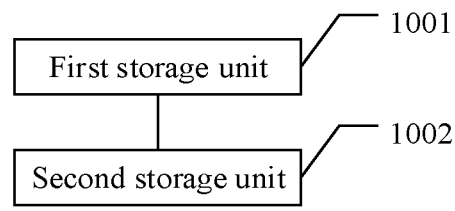
FIG. 10 is a schematic diagram of an MP4 file processing device according to an embodiment of this application.

Referring to FIG. 10, an embodiment of an MP4 file processing device in the embodiments of this application includes a first storage unit 1001 configured to store private media information into a header of MDAT of an MP4 file during recording of the MP4 file, where the private media information includes a media information parameter of frame data in the MP4 file, and a second storage unit 1002 configured to store index information of the frame data into the MDAT at intervals, where the index information includes time domain information and space domain information of the frame data.

In this embodiment of this application, the first storage unit 1001 stores the private media information into the header of the MDAT of the MP4 file during recording of the MP4 file. The private media information includes the media information parameter of the frame data in the MP4 file. The second storage unit 1002 stores the index information of the frame data into the MDAT at intervals. The index information includes the time domain information and the space domain information of the frame data. When a file trailer of the MP4 file is incomplete, MOOV may be recovered using the private media information and the index information in the MDAT. In this way, the file can be recovered without introducing a concept of a backup file, occupying additional I/O performance of a file system, affecting a service life of a flash, or causing fragmentation of a file system.

Figure 11:
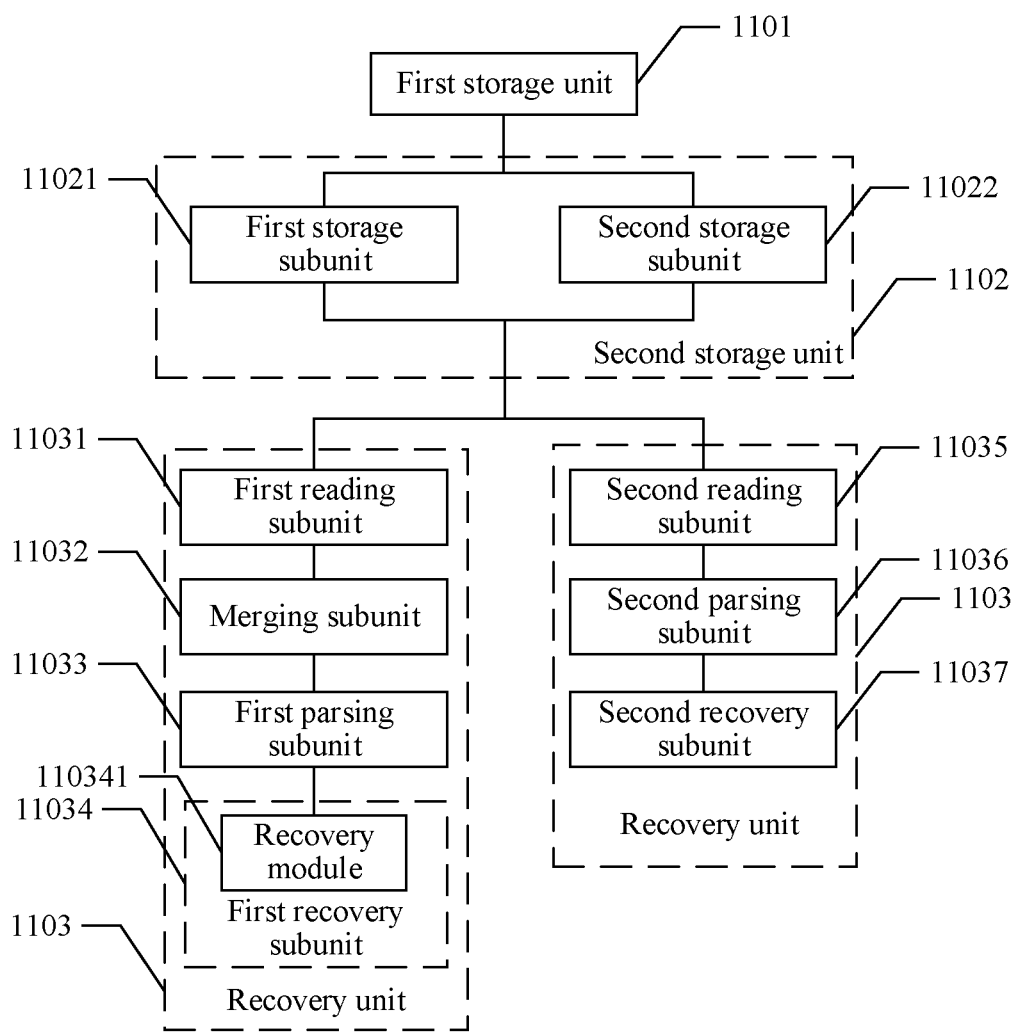
FIG. 11 is a schematic diagram of another embodiment of an MP4 file processing device according to this application.

Referring to FIG. 11, another embodiment of an MP4 file processing device in the embodiments of this application includes a first storage unit 1101 configured to store private media information into a header of MDAT of an MP4 file during recording of the MP4 file, where the private media information includes a media information parameter of frame data in the MP4 file, and a second storage unit 1102 configured to store index information of the frame data into the MDAT at intervals, where the index information includes time domain information and space domain information of the frame data.

The second storage unit 1102 includes a first storage subunit 11021 configured to store one index table into the MDAT at an interval of N-byte frame data, where the index table includes time domain information and space domain information of N-byte frame data before the index table.

Alternatively, the second storage unit 1102 includes a second storage subunit 11022 configured to, when each piece of frame data is written into the MDAT, store private frame information before each piece of frame data, where the private frame information includes time domain information and space domain information of one piece of frame data that is after the private frame information.

The processing device further includes: a recovery unit 1103 configured to recover the MP4 file based on the private media information and the index information.

The recovery unit 1103 includes a first reading subunit 11031 configured to read the private media information to obtain a media information parameter of each piece of frame data, a merging subunit 11032 configured to merge the index tables to obtain a complete index table, a first parsing subunit 11033 configured to parse private frame information of trailer frame data to obtain time domain information and space domain information of the trailer frame data, where the trailer frame data is frame data that is after a last index table, and a first recovery subunit 11034 configured to recover the MP4 file based on the media information parameter of each piece of frame data and the complete index table.

The first recovery subunit 11034 includes a recovery module 110341 configured to recover the MP4 file based on the media information parameter of each piece of frame data, the complete index table, and the time domain information and the space domain information of the trailer frame data.

Alternatively, the recovery unit 1103 includes a second reading subunit 11035 configured to read the private media information to obtain a media information parameter of each piece of frame data, a second parsing subunit 11036 configured to parse private frame information that is before each piece of frame data, to obtain time domain information and space domain information of each piece of frame data, and a second recovery subunit 11037 configured to recover the MP4 file based on the media information parameter of each piece of frame data and the time domain information and the space domain information of each piece of frame data.

In this embodiment of this application, the first storage unit 1101 stores the private media information into the header of the MDAT of the MP4 file during recording of the MP4 file. The private media information includes the media information parameter of the frame data in the MP4 file. The second storage unit 1102 stores the index information of the frame data into the MDAT at intervals. The index information includes the time domain information and the space domain information of the frame data. When a file trailer of the MP4 file is incomplete, the recovery unit 1103 may recover MOOV using the private media information and the index information in the MDAT. In this way, the file can be recovered without introducing a concept of a backup file, occupying additional I/O performance of a file system, affecting a service life of a flash, or causing fragmentation of a file system.

Figure 12:
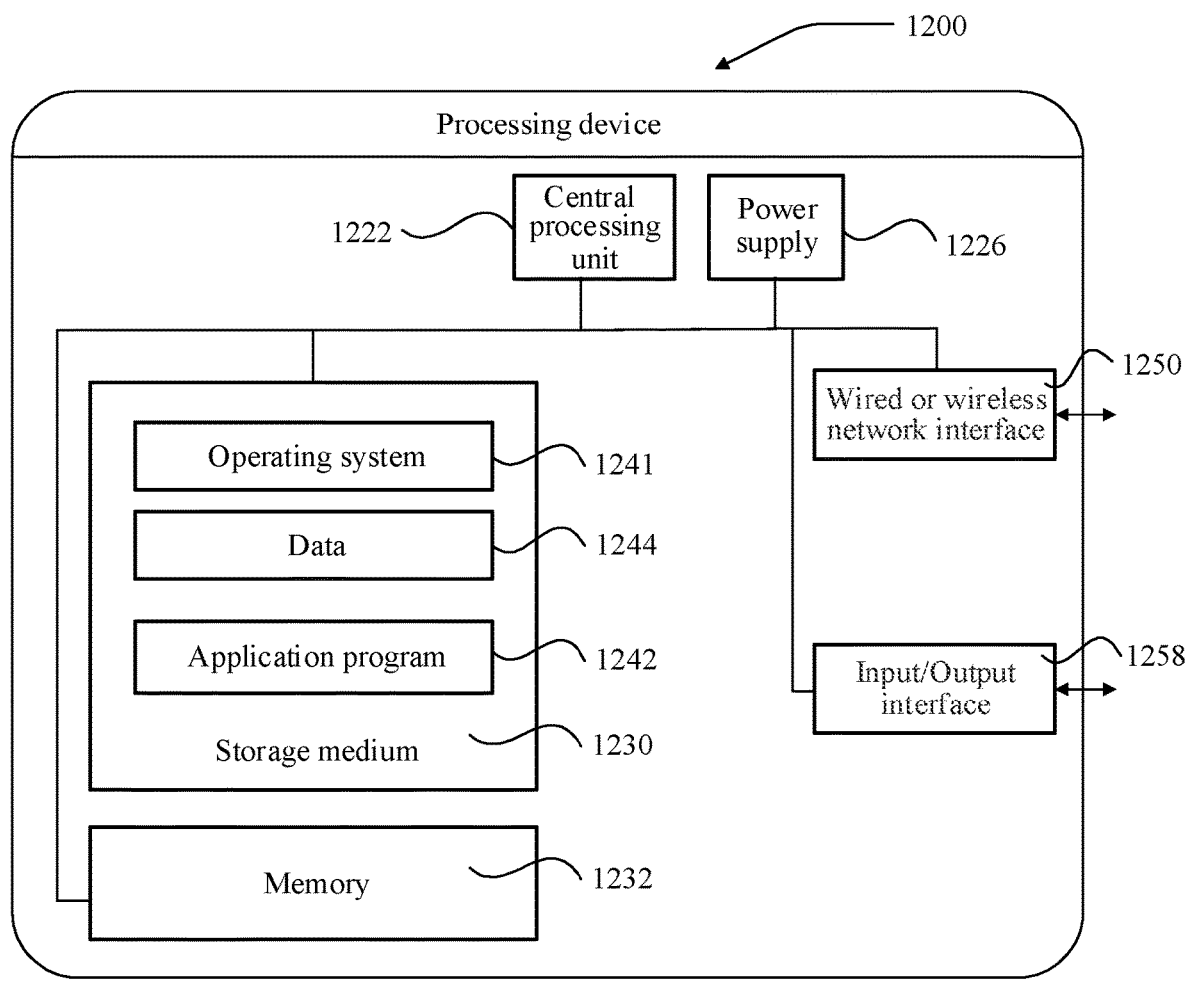
FIG. 12 is a schematic diagram of still another embodiment of an MP4 file processing device according to this application.

FIG. 12 is a schematic structural diagram of a processing device 1200 according to an embodiment of this application. The processing device 1200 is an MP4 file processing device. The device may differ greatly due to different configurations or performance, and may include one or more CPU 1222 (for example, one or more processors), a memory 1232, and one or more storage media 1230 (for example, one or more mass-capacity storage devices) that store an application program 1242 or data 1244. The memory 1232 and the storage medium 1230 may be used for transient storage or persistent storage. The program stored in the storage medium 1230 may include one or more modules (not shown in the figure). Each module may include a series of instruction operations for the processing device. Further, the central processing unit 1222 may be configured to communicate with the storage medium 1230, and perform, on the processing device 1200, a series of instruction operations in the storage medium 1230.

The processing device 1200 may further include one or more power supplies 1226, one or more wired or wireless network interfaces 1250, one or more input/output interfaces 1258, and/or one or more operating systems 1241, for example, WINDOWS SERVER, MAC OS X, UNIX, LINUX, or FREEBSD.

The steps performed by the processing device in the foregoing embodiments may be based on a structure of the processing device shown in FIG. 12.

All or some of the foregoing embodiments may be implemented using software, hardware, firmware, or any combination thereof. When software is used to implement the embodiments, all or some of the embodiments may be implemented in a form of a computer program product.

The computer program product includes one or more computer instructions. When the computer program instructions are loaded and executed on a computer, all or some of the procedures or functions according to the embodiments of this application are generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, digital versatile disc (DVD)), a semiconductor medium (for example, a solid-state drive (SSD)), or the like.

It may be clearly understood by a person skilled in the art that, for the purpose of convenient and brief description, for a detailed working process of the foregoing system, apparatus, and unit, refer to a corresponding process in the foregoing method embodiment, and details are not described herein.

In the embodiments provided in this application, it should be understood that the disclosed system, apparatus, and method may be implemented in other manners. For example, the described apparatus embodiment is merely an example. For example, division into units is merely logical function division and may be other division in an embodiment. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or other forms.

The units described as separate components may or may not be physically separate, and components displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in a form of a software functional unit and sold or used as an independent product, the integrated unit may be stored in a computer-readable storage medium. Based on such an understanding, the technical solutions of this application essentially, or the part contributing to another approach, or all or some of the technical solutions may be implemented in the form of a software product. The computer software product is stored in a storage medium and includes instructions for instructing a computer device (which may be a personal computer, a server, a network device, or the like) to perform all or some of the steps of the methods described in the embodiments of this application. The foregoing storage medium includes any medium that can store program code, such as a Universal Serial Bus (USB) flash drive, a removable hard disk, a read-only memory (ROM), a random access memory (RAM), a magnetic disk, or an optical disc.

The foregoing embodiments are merely intended for describing the technical solutions of this application, but not for limiting this application. Although this application is described in detail with reference to the foregoing embodiments, a person of ordinary skill in the art should understand that they may still make modifications to the technical solutions described in the foregoing embodiments or make equivalent replacements to some technical features thereof, without departing from the spirit and scope of the technical solutions of the embodiments of this application.

What is claimed is:

1. A Movie Picture Expert Group-4 (MP4) file processing method, comprising:
    storing private media information into media data (MDAT) of an MP4 file while recording the MP4 file, wherein the private media information comprises a media information parameter of frame data in the MP4 file; and
    storing index information and the frame data in the MDAT at intervals, wherein the index information comprises time domain information of the frame data and space domain information of the frame data, wherein the private media information and the index information are used to recover the MP4 file when the MP4 file is incomplete.

2. The MP4 file processing method of claim 1, wherein the index information comprises an index table or private frame information.

3. The MP4 file processing method of claim 2, wherein storing the index information and the frame data in the MDAT at intervals comprises storing the index table into the MDAT at an interval of N-byte frame data, wherein the index table comprises the time domain information and the space domain information of the N-byte frame data, and wherein the N-byte frame data is placed before the index table.

4. The MP4 file processing method of claim 2, wherein storing the index information and the frame data into the MDAT at intervals comprises storing private frame information before each piece of frame data when each piece of frame data is written into the MDAT, wherein the private frame information comprises time domain information of one piece of the frame data and space domain information of the one piece of the frame data, wherein the one piece of the frame data is placed after the private frame information.

5. The MP4 file processing method of claim 1, wherein after storing the index information and the frame data into the MDAT at intervals, the private media information and the index information are used to recover the MP4 file when the MP4 file is incomplete.

6. The MP4 file processing method of claim 5, wherein recovering the MP4 file based on the private media information and the index information comprises:
    reading the private media information to obtain a media information parameter of each piece of frame data;
    merging index tables to obtain a complete index table; and
    recovering the MP4 file based on the media information parameter of each piece of frame data and the complete index table.

7. The MP4 file processing method of claim 6, wherein after merging the index tables to obtain the complete index table, the MP4 file processing method further comprises parsing private frame information of trailer frame data to obtain time domain information of the trailer frame data and space domain information of the trailer frame data, and wherein the trailer frame data is after a last index table.

8. The MP4 file processing method of claim 7, wherein recovering the MP4 file based on the media information parameter of each piece of the frame data and the complete index table comprises recovering the MP4 file based on the media information parameter of each piece of frame data, the complete index table, the time domain information of the trailer frame data, and the space domain information of the trailer frame data.

9. The MP4 file processing method of claim 5, wherein recovering the MP4 file based on the private media information and the index information comprises:
  reading the private media information to obtain a media information parameter of each piece of frame data;
  parsing private frame information that is before each piece of frame data to obtain time domain information of each piece of the frame data and space domain information of each piece of the frame data; and
  recovering the MP4 file based on the media information parameter of each piece of the frame data, the time domain information of each piece of the frame data, and the space domain information of each piece of the frame data.

10. A Movie Picture Expert Group-4 (MP4) file processing device, comprising:
  a processor; and
  a memory coupled to the processor and storing instructions that, when executed by the processor, cause the processing device to be configured to:
    store private media information into media data (MDAT) of an MP4 file while recording the MP4 file, wherein the private media information comprises a media information parameter of frame data in the MP4 file; and
    store index information and the frame data in the MDAT at intervals, wherein the index information comprises time domain information of the frame data and space domain information of the frame data, wherein the private media information and the index information are used to recover the MP4 file when the MP4 file is incomplete.

11. The MP4 file processing device of claim 10, wherein the index information comprises either at least one index table or private frame information.

12. The MP4 file processing device of claim 11, wherein the instructions further cause the MP4 processing device to be configured to store one index table into the MDAT at an interval of N-byte frame data, wherein the index table comprises time domain information and space domain information of the N-byte frame data, and wherein the N-byte frame data is placed before the index table.

13. The MP4 file processing device of claim 11, wherein the instructions further cause the MP4 file processing device to be configured to store private frame information before each piece of frame data when each piece of frame data is written into the MDAT, wherein the private frame information comprises time domain information of one piece of the frame data and space domain information of one piece of the frame data, wherein the one piece of the frame data is placed after the private frame information.

14. The MP4 file processing device of claim 10, wherein, after the index information and the frame data are stored into the MDAT at intervals, the private media information and the index information are used to recover the MP4 file when the MP4 file is incomplete.

15. The MP4 file processing device of claim 14, wherein the instructions further cause the MP4 file processing device to be configured to:
  read the private media information to obtain a media information parameter of each piece of frame data;
  merge index tables to obtain a complete index table; and
  recover the MP4 file based on the media information parameter of each piece of frame data and the complete index table.

16. The MP4 file processing device of claim 15, wherein the instructions further cause the MP4 file processing device to be configured to parse private frame information of trailer frame data to obtain time domain information of the trailer frame data and space domain information of the trailer frame data, and wherein the trailer frame data is after a last index table.

17. The MP4 file processing device of claim 16, wherein the instructions further cause the MP4 file processing device to be configured to recover the MP4 file based on the media information parameter of each piece of frame data, the complete index table, the time domain information of the trailer frame data, and the space domain information of the trailer frame data.

18. The MP4 file processing device of claim 14, wherein the instructions further cause the MP4 file processing device to be configured to:
  read the private media information to obtain a media information parameter of each piece of frame data;
  parse private frame information that is before each piece of frame data, to obtain time domain information of each piece of the frame data and space domain information of each piece of the frame data; and
  recover the MP4 file based on the media information parameter of each piece of frame data and the time domain information of each piece of the frame data, and the space domain information of each piece of the frame data.

19. A non-transitory computer-readable storage medium configured to store instructions that, when executed by a processor of an apparatus, cause an apparatus to:
  store private media information into media data (MDAT) of an Movie Picture Expert Group-4 (MP4) file while recording the MP4 file, wherein the private media information comprises a media information parameter of frame data in the MP4 file; and
  store index information and the frame data in the MDAT at intervals, wherein the index information comprises time domain information of the frame data and space domain information of the frame data, wherein the private media information and the index information are used to recover the MP4 file when the MP4 file is incomplete.

20. The non-transitory computer-readable storage medium of claim 19, wherein the index information comprises an index table or private frame information.

* * * * *